United States Patent

[11] 3,625,754

[72] Inventor Richard L. Dunn
Raleigh, N.C.
[21] Appl. No. 8,072
[22] Filed Feb. 2, 1970
[45] Patented Dec. 7, 1971
[73] Assignee Beaunit Corporation
New York, N.Y.

[54] SURFACE-MODIFIED POLYESTER ARTICLE
4 Claims, No Drawings

[52] U.S. Cl. .................................................... 117/138.8 F,
8/115.6, 8/179, 8/DIG. 4, 117/139.5 A,
117/161 K, 260/22 D
[51] Int. Cl. ......................................................... B32b 27/08,
B32b 27/36
[50] Field of Search ............................................. 260/22 D,
7.5, 9; 117/138.8 F, 161 K, 139.5 A

[56] References Cited
UNITED STATES PATENTS
3,416,952 12/1968 McIntyre et al. ............. 117/139.5 A
3,390,108 6/1968 Keck .......................... 260/22 D Primary Examiner—William D. Martin
Assistant Examiner—Ralph Husack
Attorneys—Donald E. Gillespie and James H. Ewing ABSTRACT: Surface-modified polyester articles are provided having soil-release properties and improved dispersed dyeability comprising a copolyester comprising at least 85 percent by weight of ethylene terephthalate units and about one to 15 percent by weight of ethylene dimerate units, and having cocrystallized on the surface thereof a copolymer comprising at least 40 percent by weight of polyoxyalkylene groups, at least 9.5 percent by weight of ethylene terephthalate units and at least 0.5 percent by weight of ethylene dimerate units. The surface-modified polyester articles are prepared by applying a copolymer comprising polyoxyalkylene groups, ethylene terephthalate units, and ethylene dimerate units to the copolyester comprising ethylene terephthalate units and ethylene dimerate units and subjecting the surface treated copolyester article to a temperature of at least 80° C. for a time sufficient to cause cocrystallization to take place on the surface of the treated copolyester.

SURFACE-MODIFIED POLYESTER ARTICLE

BACKGROUND OF THE INVENTION

1. Field of the Invention

This invention relates to surface-modified polyester articles, such as filaments, staple, yarn, fabric and the like, having outstanding soil-release and antiredeposition properties and outstanding disperse dyeability characteristics and to a process for providing such surface-modified polyester articles.

2. Description of the Prior Art

The art on producing soil release, surface-modified articles is replete with processes used to impart hydrophilic properties to an otherwise hydrophobic surface. Most of these processes involve either chemically etching the article surface by hydrolysis, or employ other chemical-modifying treatments such as graft polymerization or involve bonding some hydrophilic agent to the polyester surface through chemical reaction or through physical adhesion as a coating thereon.

Among the latter is the process disclosed in U.S. Pat. No. 3,416,952, to McIntyre et al. which discloses a process whereby a shaped article of an essentially linear crystallizable polyester, e.g., polyethylene terephthalate, of which the crystallizable portions, e.g., ethylene terephthalate, comprise successions of repeat units is treated with a crystallizable compound having sufficient of the same repeat units, e.g., ethylene terephthalate, to confer crystallizability on said compound and at least one active group, e.g., polyoxyalkylene, serving to modify the surface of the treated article. This procedure has been found to provide excellent soil-release properties in most instances.

U.S. Pat. No. 3,390,108 to Kech et al. discloses copolyester compositions having excellent affinity for disperse dyes. These compositions are copolyesters of ethylene glycol, terephthalic acid and dimer acid, which contain from about 98.6 to 87.2 percent by weight of ethylene terephthalate and about 1.4 to 12.8 percent by weight of ethylene dimerate. In order to improve the soil-release and antiredeposition properties of such copolyesters they were treated in accordance with the teachings of the McIntyre et al. patent discussed above with a crystallizable compound comprised of ethylene terephthalate units to confer crystallizability on said compound and polyoxyethylene groups to modify the surface of the article to render the surface of the shaped article hydrophilic and therefore wettable by water. However, it was discovered that in this instance, there was no significant improvement in the soil-release and antiredeposition properties of the copolyester.

SUMMARY OF THE INVENTION

It is the primary object of this invention to improve the soil-release properties of copolyester articles comprising at least 85 percent by weight of ethylene terephthalate and from about 1 to 15 percent by weight of ethylene dimerate.

Other objects and advantages of the present invention will be apparent from the detailed description which follows.

The objects of this invention are accomplished and the disadvantages found in the prior art practices are overcome by providing surface-modified polyester articles having soil-release properties and improved dispersed dyeability comprising a copolyester comprising at least 85 percent by weight of ethylene terephthalate units and about 1 to 15 percent by weight of ethylene dimerate units, and having cocrystallized on the surface thereof a copolymer comprising at least 40 percent by weight of polyoxyalkylene groups, at least 9.5 percent by weight of ethylene terephthalate units and at least 0.5 percent by weight of ethylene dimerate units. The surface-modified polyester articles are prepared by applying a copolymer comprising polyoxyalkylene groups, ethylene terephthalate units, and ethylene dimerate units to the copolyester comprising ethylene terephthalate units and ethylene dimerate units and subjecting the surface-treated copolyester article to a temperature of at least 80° C. for a time sufficient to cause cocrystallization to take place on the surface of the treated copolyester.

DESCRIPTION OF THE PREFERRED EMBODIMENTS

The copolyester articles treated in accordance with this invention are copolymers of ethylene glycol and terephthalic acid and dimer acid in which the dimer acid units comprise from about 1 to 15 percent by weight of the acid units in the copolyester. These copolyesters have been found to have greatly improved disperse dye affinity and are prepared by reacting ethylene glycol with terephthalic acid and dimer acid or with ester-forming derivatives of the acids. The dimer acid which may be used can be prepared by dimerizing an unsaturated fatty acid containing 18 carbon atoms such as linoleic or linolenic acid or a monohydric alcohol ester thereof. The particular dimer acid needed is described in detail in U. S. Pat. No. 3,390,108. "Empol" 1010 dimer acid, available from Emery Industries, Inc., and containing 97 percent dimer, 3 percent trimer, no monobasic acids, and possessing extremely low saturation, has been found to be particularly effective for use in the preparation of the copolyester to be treated and the treating copolymer. The mole ratio of terephthalic acid radicals to dimer acid radicals in the copolymer formed will be from 99.5:0.5 to 95:5. These copolyesters are obtained by reacting together ethylene glycol, terephthalic acid or ester-forming derivatives thereof and dimer acid or ester-forming derivatives thereof under conventional polyester-forming conditions or by reacting ethylene glycol and terephthalic acid or ester-forming derivatives thereof and then with dimer acid or ester-forming derivatives thereof prior to polymerization under conventional polyester-forming conditions. The copolyesters obtained are then extruded or shaped by conventional techniques and formed into shaped articles, such as filaments, films, fabrics, and the like, which then are surface modified to give the products of this invention. The copolyesters are preferably formed into filaments and treated in accordance with the present invention.

The treating copolymers are conveniently prepared by reacting ethylene glycol, terephthalic acid or ester-forming derivatives thereof, dimer acid or ester-forming derivatives thereof, and a polyoxyalkylene glycol by conventional esterification and polymerization techniques.

The treating copolymer critical for the purposes of this invention is a copolymer comprised of ethylene terephthalate units which are repeat units identical with those forming the crystallizable portions of the copolyester being treated, polyoxyalkylene groups sufficient to render the surface of the copolyester hydrophilic and therefore wettable by water, and a small percentage of ethylene dimerate units, the presence of which has been found to be critical to the operation of the present invention. The viscosity of the copolymer used for the purposes of this invention will range from about 0.3 to 0.9 as measured in a 0.4 percent solution in trifluoroacetic acid at 30° C.

The treating copolymer should contain from about 40 to 90 percent by weight of polyoxyalkylene groups and preferably will contain from about 65 to 85 percent by weight of these groups. The polyoxyalkylene group is derived from a polyoxyalkylene glycol having an average molecular weight of from about 300 to 6,000 and preferably having an average molecular weight of from about 4,000 to 6,000. Suitable polyoxyalkylene groups for the purpose of the present invention include polyoxymethylene, polyoxyethylene, polyoxypropylene, polyoxybutylene, and the like. Preferably, the polyoxyalkylene groups will be polyoxethylene groups.

The treating copolymer should contain from about 9.5 to 50 percent by weight of ethylene terephthalate units and preferably will contain from about 13 to 25 percent by weight of these units. These units are identical with the crystallizable repeat units found in the copolyester to be treated and are believed to cocrystallize with those identical units in the treated article in order to fix the treating copolymer to the article.

The treating copolymer should contain from about 0.5 to 10 percent by weight of ethylene dimerate units and preferably will contain from about 2 to 10 percent by weight of these units. It is believed that these units in the treated article and the treating copolymer are amorphous in nature and do not crystallize. However, it has been found that if a small quantity of these units is not present in the treating copolymer the improved soil-release properties are not obtained. Therefore, it is critical that the ethylene dimerate units are present in the treating copolymer.

In order to obtain a durable bonding between the treating copolymer and the copolyester treated, it is necessary that the treating copolymer be crystallizable. However, it is not necessary that the treating copolymer be applied to the surface of the copolyester article in a crystalline form. The treating copolymer may be applied to the copolyester article as a molten material, as a solution in a plasticizer for the copolyester being treated, as a solution in a solvent which does not plasticize the copolyester being treated, or a suspension or dispersion of the treating copolymer in a liquid medium. A preferred method of applying the treating copolymer is from a dispersion in water or aqueous medium.

In order to produce a durable surface treatment it is necessary to heat the article after applying the treating copolymer thereto. A temperature of above about 80° C. is required to produce a durable surface treatment. A heat treatment in the range of from about 80° C. to just below the melting point of the copolyester being treated for a time sufficient to cause cocrystallization to take place between the ethylene terephthalate units of the treating copolymer and the copolyester being treated has been found to be satisfactory. It has been found that a heat treatment at a temperature of about 100° to 180° C. for a period of from about 3 to 5 minutes provides very satisfactory results.

The treating copolymer should be applied to the surface of the copolyester article so that from about 0.20 to 0.70 percent by weight solids are present on the surface of the copolyester. A preferred procedure for the preparation of the surface-modified copolyester articles of this invention would be to disperse a copolymer having an intrinsic viscosity of about 0.7 as measured in an 0.4 percent solution in trifluoroacetic acid at about 30° C. and comprising about 80 percent by weight of polyoxyethylene terephthalate groups which have been derived from a polyoxyethylene glycol of average molecular weight of 4,000 to 6,000, about 15 percent by weight of ethylene terephthalate units, and about 5 percent by weight of ethylene dimerate units in water to provide about a 3 to 10 percent solids dispersion at about 40° to 60° C. This dispersion is then diluted to provide a dispersion of about 0.75 to 2.25 percent by weight solids which is applied to the surface of a copolyester article, preferably in filament form, comprising 87.2 to 98.6 percent by weight of ethylene terephthalate units and 1.4 to 12.8 percent by weight of ethylene dimerate units. The treated copolyester article is then heated at a temperature of 100° to 180° C. to attain a durable coating of the treating copolymer upon the article, said coating sufficient to provide a polyoxyalkylene concentration of at least $2 \times 10^{-8}$ g./cm.$^2$ of surface of the treated article and preferably a polyoxyalkylene concentration of from about $2 \times 10^{-7}$ to $2 \times 10^{-5}$ g./cm$^2$ of surface of the treated article.

In the preparation of the surface-modified articles of this invention, other conventional modifying agents, such as delusterants, antioxidants, plasticizers, stabilizers, and the like, may be incorporated in the copolyester article and/or in the treating copolymers.

The following examples are used to illustrate the present invention and not intended to limit it in any way. Unless otherwise noted percentages as expressed in the examples indicate percent by weight.

The treating copolymers in each example were prepared by reacting the necessary quantities of dimethyl terephthalate, ethylene glycol, bis(hydroxyethyl) dimerate, and polyoxyethylene glycol having an average molecular weight of 4,000 under conventional polyester-forming conditions to obtain a copolymer having an intrinsic viscosity as indicated.

EXAMPLE 1

A treating copolymer comprising about 15.3 percent by weight of ethylene terephthalate units, about 4.6 percent by weight of ethylene dimerate units, and about 80.1 percent by weight of polyoxyethylene groups was prepared as follows:

A 3-liter three-neck flask fitted with a stirrer, a thermometer and distillation accessories was charged with 149.2 grams of dimethyl terephthalate, 119.0 grams of ethylene glycol, 854.0 grams of polyoxyethylene glycol having an average molecular weight of about 4,000, 52.14 grams of bis(hydroxyethyl) dimerate, 0.13 gram of zinc diacetate, 0.34 gram of antimony trioxide, and 0.37 gram of Irganox 1093 antioxidant. The mixture was heated with stirring at a temperature of from 194° to 220° C. over a period of several hours until the evolution of methanol was complete. The product was then transferred in molten state to a 1-liter autoclave heated to 180° C. The temperature was slowly increased and vacuum applied so that after 1 hour and 45 minutes a temperature of 275° C. and a pressure of less than 3.0 millimeters of mercury pressure was obtained. After an additional 45 minutes under these conditions the polymer was discharged from the autoclave into water at 53° C. with vigorous agitation to give a 7 percent by weight solids dispersion. A sample of the polymer taken directly from the extrusion nozzle had an intrinsic viscosity of 0.881 as measured in a 0.4 percent solution in trifluoroacetic acid at 30° C.

A 75 d.p.f. undrawn tow of copolyester comprising about 92.5 percent by weight of ethylene terephthalate units and about 7.5 percent by weight of ethylene dimerate units was passed through a hot water bath at 80° C. to wet cool the filaments. The wet coated filaments were nipped free of superfluous liquid and drawn to a denier of about 15 d.p.f., or about 500 percent, at a draw temperature of about 100° C. The drawn filaments were heat treated at 200° C. for about 1 second to relax strains set up in drawing. The tow was then passed through the aqueous dispersion prepared above diluted to 20 percent so as to give a dispersion containing about 1.4 percent by weight solids of the treating copolymer. The drawn two was passed through the dispersion at a rate of about 62 meters/minutes to wet coat the filaments. The wet coated filaments were nipped free of superfluous liquid providing a wet pickup of about 20 percent and a treating copolymer concentration of about $1.1 \times 10^{-6}$ grams per square centimeter of filament surface. The treated filaments were then dried and heat treated at about 166° C. for about 6 seconds to fix the treating copolymer to the fiber. The tow was then crimped and cut for processing into yarn.

A sample of the treated and crimped tow was stained with 30 SAE motor oil, washed for 5 minutes with a hot aqueous solution of the commercial detergent Tide, rinsed in cold water, and dried. The staining and washing was repeated until the stains were not removed by a wash. The soil-release properties were maintained for seven washings as compared to three washings for untreated copolyester tow and four washings for a copolyester tow treated in an identical manner using a treating copolymer comprising only ethylene terephthalate units and polyoxyethylene groups.

EXAMPLE 2

A treating copolymer comprising about 15.3 percent by weight of ethylene terephthalate units, about 4.6 percent by weight of ethylene dimerate units, and about 80.1 percent by weight of polyoxyethylene groups and having an intrinsic viscosity of about 0.75 was prepared as described in example 1 except that there was a hold time of 30 minutes at 275° C. instead of 45 minutes.

A 15 d.p.f. tow of a copolyester comprising from about 92.5 percent by weight of ethylene terephthalate units and about 7.5 percent by weight of ethylene dimerate units was processed and treated with the treating copolymer described above following the procedure as described in example 1.

A sample of the treated tow was found to retain its soil-release properties for seven washings following the procedure as described in example 1. A sample of the treated tow was processed into yarn and the yarn tufted in to cut-pile carpet. The carpet had an excellent appearance, exhibited very good soil-release properties and dyed a deep shade with disperse dyestuffs using conventional dyeing procedures.

A sample of treated tow was processed in an identical manner except that the treating copolymer was applied prior to drawing. The tow was found to retain its soil-release properties for six washings.

Treating copolymers identical to that described above except having intrinsic viscosities of about 6.68, about 0.71, and about 0.78 respectively were prepared. A dispersion of these copolymers was applied to polyester tow as described in example 1 and the tow treated in each case was stained and washed repeatedly. In each instance the soil release properties were maintained for at least seven washings.

EXAMPLE 3

A treating copolymer comprising about 15.3 percent by weight of ethylene terephthalate units, about 4.6 percent by weight of ethylene dimerate units, and about 80.1 percent by weight of polyoxyethylene groups and having an intrinsic viscosity of about 0.65 was prepared as described in example 1 except that there was a hold time of 15 minutes at 275° C. instead of 45 minutes.

A 15 d.p.f. tow of copolyester comprising from about 92.5 percent by weight of ethylene terephthalate units and about 7.5 percent by weight of ethylene dimerate units was processed and treated with the treating copolymer described above following the procedure as described in example 1.

A sample of the treated tow was found to retain its soil-release properties for six washings following the procedure as described in example 1.

EXAMPLE 4.

A treating copolymer comprising about 15.6 percent by weight of ethylene terephthalate units, about 2.3 percent by weight of ethylene dimerate units, and about 82.1 percent by weight of polyoxyethylene groups and having an intrinsic viscosity of about 0.78 was prepared as described in example 1 except that 26.0 grams of bis(hydroxyethyl) dimerate was used instead of 52.14 grams and a hold time of 30 minutes at 275° C. was used in place of 45 minutes.

A 15 d.p.f. tow of copolyester comprising from about 92.5 percent by weight of ethylene terephthalate units and about 7.5 percent by weight of ethylene dimerate units was processed and treated with the treating copolymer described above following the procedure as described in example 1.

A sample of the treated tow was found to retain its soil-release properties for six washings following the procedure as described in example 1.

EXAMPLE 5

A treating copolymer comprising about 15.0 percent by weight of ethylene terephthalate units, about 6.7 percent by weight of ethylene dimerate units, and about 78.3 percent by weight of polyoxyethylene groups and having an intrinsic viscosity of about 0.59 was prepared as described in example 1 except that 78 grams of bis(hydroxyethyl) dimerate was used instead of 52.14 grams and hold time of 30 minutes at 275° C. was used in place of 45 minutes.

A 15 d.p.f. tow of a copolyester comprising from about 92.5 percent by weight of ethylene terephthalate units and about 7.5 percent by weight of ethylene dimerate units and processed and treated with the treating copolymer described above following the procedure as described in example 1.

A sample of the treated tow was found to retain its soil-release properties for seven washings following the procedure as described in example 1.

EXAMPLE 6

A treating copolymer comprising about 15.7 percent by weight of ethylene terephthalate units, about 4.6 percent by weight of ethylene dimerate units, and about 79.7 percent by weight of polyoxyethylene groups and having an intrinsic viscosity of about 0.90 was prepared from 171.4 grams of dimethyl terephthalate, 136.6 grams of ethylene glycol, 979.6 grams of polyoxyethylene glycol having an average molecular weight of about 6,000, 59.6 grams of bis(hydroxyethyl) dimerate, 0.26 gram of zinc diacetate, 0.68 gram of antimony trioxide, and 0.74 gram of Irganox 1093 antioxidant following the procedure as described in example 2.

A 15 d.p.f. tow of a copolyester comprising from about 92.5 percent by weight of ethylene terephthalate units and about 7.5 percent by weight of ethylene dimerate units was processed and treated with the treating copolymer prepared above following the procedure as described in example 1.

A sample of the treated tow was found to retain its soil-release properties for nine washings following the procedure as described in example 1.

EXAMPLE 7

A treating copolymer comprising about 20.7 percent by weight of ethylene terephthalate units, about 0.5 percent by weight of ethylene dimerate units, and about 78.8 percent by weight of polyoxyethylene groups and having an intrinsic viscosity of about 0.60 was prepared from 194.18 grams of dimethyl terephthalate, 150 grams of ethylene glycol, 820 grams of polyoxyethylene glycol having an average molecular weight of about 4,000, 5.76 grams of bis(hydroxyethyl) dimerate, 0.13 gram of zinc diacetate, 0.34 gram of antimony trioxide, and 0.37 gram of Irganox 1093 antioxidant following the procedure as described in example 2.

A 15 d.p.f. tow of a copolyester comprising from about 92.5 percent by weight of ethylene terephthalate units and about 7.5 percent by weight of ethylene dimerate units was processed and treated with the treating copolymer prepared above following the procedure as described in example 1.

A sample of the treated tow was found to retain its soil-release properties for five washings following the procedure as described in example 1.

EXAMPLE 8

A treating copolymer comprising about 9.85 percent by weight of ethylene terephthalate units, about 9.65 percent by weight of ethylene dimerate units, and about 80.5 percent by weight of polyoxyethylene groups and having an intrinsic viscosity of about 0.58 was prepared from 97.09 grams of dimethyl terephthalate, 75 grams of ethylene glycol, 850 grams of polyoxyethylene glycol having an average molecular weight of about 4,000, 110.5 grams of bis(hydroxyethyl) dimerate, 0.13 gram of zinc diacetate, 0.34 gram of antimony trioxide, and 0.37 gram of Irganox 1093 antioxidant following the procedure as described in example 2.

A 15 d.p.f. of a copolyester comprising from about 92.5 percent by weight of ethylene terephthalate units and about 7.5 percent by weight of ethylene dimerate units was processed and treated with the treating copolymer prepared above following the procedure as described in example 1.

A sample of the treated tow was found to retain its soil-release properties for five washings following the procedure as described in example 1.

EXAMPLE 9

A treating copolymer comprising about 23 percent by weight of ethylene terephthalate units, about 7 percent by weight of ethylene dimerate units, and about 70 percent by weight of polyoxyethylene groups and having an intrinsic viscosity of about 0.7 was prepared from 204.47 grams of dimethyl terephthalate, 155 grams of ethylene glycol, 700 grams of polyoxyethylene glycol having an average molecular weight of about 4,000, 77.41 grams of bis(hydroxyethyl) dimerate, 0.13 gram of zinc diacetate, 0.34 gram of antimony trioxide, and 0.37 gram of Irganox 1093 antioxidant following the procedure as described in example 2.

A 15 d.p.f. tow of a copolyester comprising from about 92.5 percent by weight of ethylene terephthalate units and about 7.5 percent by weight of ethylene dimerate units was processed and treated with the treating copolymer prepared above following the procedure as described in example 1.

A sample of the treated tow was found to retain its soil-release properties for 12 washings following the procedure as treated in example 1.

EXAMPLE 10

A treating copolymer comprising about 9.6 percent by weight of ethylene terephthalate units, about 0.5 percent by weight of ethylene dimerate units, and about 89.9 percent by weight of polyoxyethylene groups and having an intrinsic viscosity of about 0.31 was prepared from 93.52 grams of dimethyl terephthalate, 75 grams of ethylene glycol, 900 grams of polyoxyethylene glycol having an average molecular weight of about 4,000, 5.76 grams of bis(hydroxyethyl) dimerate, 0.13 gram of zinc diacetate, 0.34 gram of antimony trioxide, and 0.37 gram of Irganox 1093 antioxidant following the procedure as described in example 2.

A 15 d.p.f. tow of a copolyester comprising from about 92.5 percent by weight of ethylene terephthalate units and about 7.5 percent by weight of ethylene dimerate units was processed and treated with the treating composition prepared above following the procedure as described in example 1.

A sample of the treated tow was found to retain its soil-release properties for five washings following the procedure as described in example 1.

It is to be understood that changes and variations may be made from the foregoing embodiments of the present invention without departing from the spirit and scope thereof as defined in the appended claims.

What is claimed is:

1. A surface-modified polyester article having excellent soil-release properties and excellent dispersed dyeability comprising a copolyester comprising at least 85 percent by weight of ethylene terephthalate units and about 1 to 15 percent by weight of ethylene dimerate units and having cocrystallized on the surface thereof a copolymer comprising at least 40 percent by weight of polyoxyalkylene groups, at least 9.5 percent by weight of ethylene terephthalate units and at least 0.5 percent by weight of ethylene dimerate units.

2. A surface-modified polyester article as defined in claim 1 wherein the copolyester has cocrystallized on the surface thereof a copolymer comprising about 40 to 90 percent by weight of polyoxyalkylene groups having an average molecular weight of about 300 to 6,000, about 9.5 to 50 percent by weight of ethylene terephthalate units and about 0.5 to 10 percent by weight of ethylene dimerate units.

3. A surface-modified polyester article as defined in claim 2 wherein the copolyester comprises from about 87.2 to 98.6 percent by weight of ethylene terephthalate units and about 1.4 to 12.8 percent by weight of ethylene dimerate units and has cocrystallized on the surface thereof a copolymer comprising about 75 to 85 percent by weight of polyoxyethylene groups having an average molecular weight of about 4,000 to 6,000, about 13 to 18 percent by weight of ethylene terephthalate units and about 1 to 7 percent by weight of ethylene dimerate units.

4. A surface-modified polyester article as defined in claim 1 in the form of a fiber or filament.

* * * * *